UNITED STATES PATENT OFFICE.

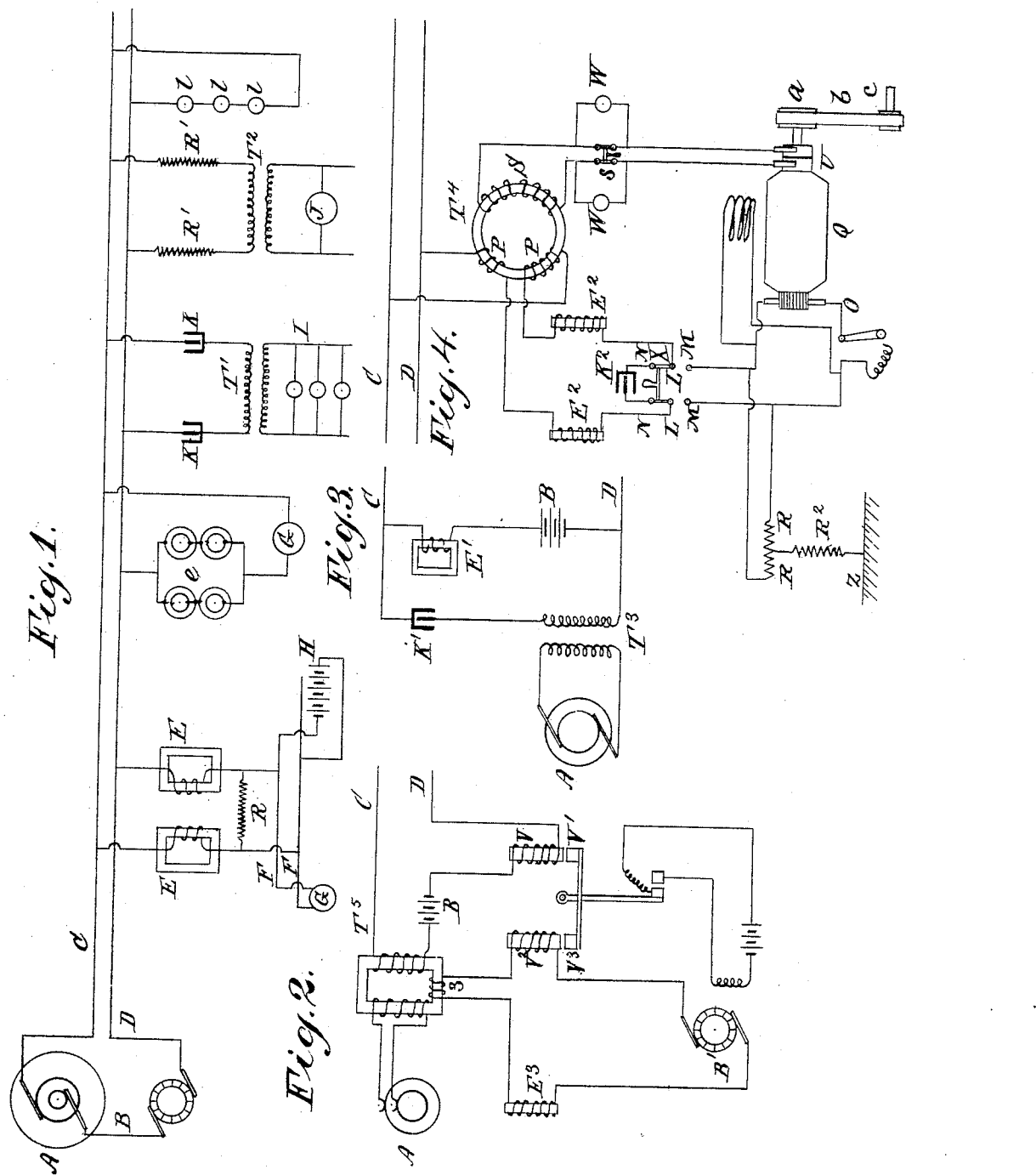

FREDERICK BEDELL, OF ITHACA, NEW YORK.

SYSTEM OF ELECTRICAL TRANSMISSION.

SPECIFICATION forming part of Letters Patent No. 695,529, dated March 18, 1902.

Application filed July 10, 1899. Serial No. 723,253. (No model.)

*To all whom it may concern:*

Be it known that I, FREDERICK BEDELL, a citizen of the United States, residing at Ithaca, county of Tompkins, State of New York, have invented certain new and useful Improvements in Systems of Electrical Transmission, of which the following is a specification, reference being made to the accompanying drawings, wherein—

Figure 1 is a general diagram illustrating my invention. Figs. 2 and 3 show modifications thereof, and Fig. 4 shows one useful application of the same.

My invention relates to certain improvements in apparatus to be employed in a system involving the transmission of both direct and alternating currents over the same line conductors and the utilizing of either the direct or the alternating current, as may be desired.

My invention relates particularly to a rotary converter adapted to be employed in a system of the kind described; and it consists in the means to be employed in bringing the converter up to speed by direct current transmitted from a central station over the outgoing and return conductors and in then operating it by alternating current transmitted over the same conductors.

In addition my invention comprises certain combinations of devices applicable to a system of this type, which will be hereinafter described and claimed.

Referring to the accompanying drawings, Fig. 1, A shows an ordinary alternating-current generator, and B a direct-current generator in series with generator A, both being connected to line-wires C and D. It will thus be evident that there is imposed upon the line a constant electromotive force by the direct-current generator upon which are superadded the fluctuations of electromotive force caused by the alternating generator A, whose pressure is alternately added to and subtracted from that of the generator B. It is obvious that the line-wires C D will carry alternating or direct current, according to the demands of the translating devices connected thereto, the resultant line-current being variable and unsymmetrical in reference to the zero-line, and may be wholly above the zero-line or may cross it to a greater or less extent, and so be either a direct or an alternating current, according to the predominance of one component or the other.

It will be understood that if suitable apparatus is provided which will take from the line a direct current only and exclude the alternating-current component such apparatus may be operated from the line-wires C D, and if, on the other hand, another type of apparatus will receive the alternating component only to the exclusion of the direct current it also may be operated from the same line-wires.

The direct-current form of receiving apparatus which I employ is as follows: It is well known that the current variations or the variable component of the total current on the wires C D will give rise to self-inductive effect corresponding to those produced by similar variations in alternating currents and that such self-inductive effect may be such as to prevent any appreciable flow of variable current in a branch circuit, although such circuit may have a low ohmic resistance, which would present no appreciable obstruction to the passage of a direct current. I provide direct-current mains F F, to which direct-current apparatus is connected, and connect these mains respectively with the conductors C and D, and in each connecting-wire I include a choking-coil E, designed with low resistance and with correspondingly high self-induction, so that they will readily permit the passage of the direct-current component of the total current, but will effectually shut off the variable element corresponding to the component produced by the alternating generator A. The high self-induction of the choking-coil E, I prefer to obtain by constructing the iron core with large cross-section in relation to the number of turns, by which method it becomes possible for the coil to have the necessary high self-induction for restricting the flow of the variable component and at the same time permits the direct component to flow through the coil to the direct-current mains without magnetizing the iron beyond the saturation-point. The same high self-induction might be obtained by means of a coil with a greater number of turns with a smaller amount of iron; but in such a case on account of the greater number of turns the direct current would magnetize the iron beyond the saturation-point. Hence such a construction of a choking-coil as has been indicated is necessary in order to make its inductive operation sufficient to restrain the flow of the variable component of current. In order, moreover, to prevent the full alternating-current pressure of the lines C D being impressed upon the mains F F when the latter are on open circuit, being disconnected from all translating devices, I provide a resistance R, which when desired is permanently in circuit, so that a small current will flow through the choking-coils E E at all times and secure the self-inductive effect necessary for restraining the alternating pressure.

The apparatus for utilizing the direct current is shown as the motor G and the storage-battery H, but may consist of any preferred direct-current-translating devices, as a series of arc-lamps or an electrolytic bath.

Although I prefer to employ a choking-coil for restricting the flow of alternating current to the direct-current-receiving apparatus, any desired form of selective device may be employed, such as the electrolytic cell $e$, which may consist of carbon and platinum electrodes in a solution of sulfuric acid or several such cells. On the other hand, the device for receiving alternating currents to the exclusion of direct currents consists of a transformer, as shown at T' and $T^2$ in Fig. 1, together with the condensers K K and resistances R' R', respectively. As is well known, a transformer will give in its secondary only such currents as are induced by the variations in its primary, so that the effect of the direct-current component of the supplied current will not appear at all in the secondary of the transformer and will appear in the primary to a degree which may in many cases be neglected, as in the case where the direct electromotive force applied to the line is small in comparison with the alternating electromotive force. In such a situation the resistance of the primary of a transformer connected directly to mains C and D may be made so high that only a negligible amount of direct current will flow. This may, however, be still further reduced by non-inductive resistances R' R' inserted in the primary circuit or may be shut off entirely by interposing in the primary the condensers K K, which will only transmit the alternating or variable components of the total current.

If condensers are not used, it will be desirable to proportion the resistances R' R' and to construct the transformer in such a manner that only such direct current may pass as will not interfere with the action of the transformer, as it may do even if the value of the current is negligible as a factor of loss by magnetizing the iron core of the transformer to such an extent that the superposed alternating current will saturate the iron before its maximum value is reached. To avoid this, I construct a transformer containing an amount of iron in its core corresponding to the value of the direct component of the current plus an amount corresponding to the alternating component.

It is to be understood that the direct current which is permissible in an ordinary transformer without materially affecting its action is extremely small. Thus I find that in transformers of customary design constructed for operation on a ten-thousand-volt circuit and an output of one kilowatt a direct current of less than one-tenth of an ampere may seriously interfere with their operation, and a direct current much in excess of this value will so reduce the inductive action of such transformers as to render them practically inoperative. The construction of a transformer by the method I have indicated makes it possible to permit a larger flow of direct current than that just indicated; but I find, however, that even under favorable conditions of design the permissible flow of direct current in a transformer is small, so that although the leakage of direct current, as in transformer $T^2$ in Fig. 1, may be negligible it is not, generally speaking, possible to pass through a transformer a direct current of considerable value—as, for example, the main current in a direct-current power transmission.

When desired, suitable apparatus, as the lamps $l$, may be operated directly from the lines C D without the intervention of selective devices. This principle of operation already referred to applies to a transformer designed for supplying the main alternating current, as shown in Fig. 2, wherein the generator A feeds the primary circuit of the transformer $T^5$, whose secondary is connected to mains C and D in series with the battery or direct-current generator B. The transformer $T^5$ having the construction just mentioned, the arrangement of Fig. 2 becomes feasible where the direct current to be drawn from the mains C D is small in comparison with the capacity of the transformer $T^5$.

In cases where a direct current of considerable value is to be drawn from the lines C D and is therefore to flow through the secondary of transformer $T^5$, I provide demagnetizing-coil 3, deriving current from the direct-current generator B', which is regulated by an automatic governor, in which V $V^2$ are electromagnets with solid cores attracting the armatures V' and $V^3$, thereby opening and closing the field-circuit of B'. An increase of the direct-current component in the line D beyond a certain value energizes V, which attracts V', thereby energizing the field of B', which generates current through coil 3 in such a direction as to demagnetize the core and counteract the magnetizing effect of the direct current in the secondary circuit. The governor V V' is designed to maintain a proper balance between the direct-current ampere-turn of the secondary and of coil 3. The choking-coil E³ prevents the flow of alternating current in B'.

It is not necessary for the two generators to be in series, but, as shown in Fig. 3, they may work in parallel with the interposition of suitable selective devices, such as I have described. Thus in the secondary circuit of the main transformer T³, I interpose a condenser K', and in the circuit of battery or direct-current generator B, I interpose a choking-coil E'. Thus each generator will give only its appropriate electromotive force to the line, and each will work independently of the other.

In the foregoing paragraphs I have described means which may be employed for the transmission of direct and alternating currents over the same line conductors. I will now describe a rotary converter adapted to be operated by said currents and the means employed for bringing the converter to speed by means of the direct current and for maintaining its rotation by the alternating current after synchronous speed has been reached.

In Fig. 4, Q is the armature of a rotary converter having a commutator O at one end and a pair of collector-rings U at the other, the commutator and collector-rings being connected to a common winding, the field-magnet being energized from the direct-current side of the armature. T⁴ is a transformer, having its primary composed of two coils P P and its secondary connected to collector-rings U of the converter and controlled by a switch S. The inner terminals of coils P P are connected, respectively, to the points L L of a switch X, which may be thrown to connect L L with the terminals N N of condenser K² or may be thrown to connect them to the terminals M M of the direct-current side of the converter. In the latter case the coils P P will serve as choking-coils in the manner described and hold back the alternating but admit the direct current passing from the mains C D to the commutator O. The direct current will thus act on the converter and bring it up to speed as a motor, and when the proper speed and phase are reached, as may be shown by indicator-lamps W, then the switch X is thrown to close the primary circuit of the transformer through the condenser K², and switch S is thrown to connect the secondary circuit to the alternating side of the converter, the direct-current side being then applied to its work. For power the shaft c may be driven by the belt b from pulley a. Resistances R R are shown as connected, respectively, to the direct-current lines from the converter and thence connected to ground Z through resistance R², so that even in the event of the grounding of one of the line-wires C and D no dangerous potential can exist between the rotary converter or its connections and the ground. The coils E² E² may be employed when desired to supplement the action of the primary coils P P as choking-coils for holding back the alternating-current.

Although my invention may be employed for the continuous operation of both alternating and direct current translating devices, I commonly prefer to maintain only the alternating-current apparatus in continuous operation, thereby obtaining the high efficiency incident to high-pressure transmission and utilizing direct current at a low pressure for starting rotary converters and synchronous motors for exciting the fields of motors or dynamos and for such incidental purposes where direct current is necessary, but requires no large amount of power.

What I claim as new, and desire to secure by Letters Patent, is—

1. The combination with main conductors having both an alternating and a direct electromotive force impressed thereon of direct-current-translating devices connected to said mains through a choking-coil and a bridging resistance for permanently energizing the said coil.

2. The combination with main conductors having both an alternating and a direct electromotive force impressed thereon and a rotary converter with direct-current commutator and alternating-current collector-rings connected to a common armature-winding, of a choking-coil of low resistance and high self-induction interposed between the said main and commutator.

3. The combination with main conductors having both an alternating and a direct electromotive force impressed thereon and direct-current-receiving apparatus connected to said main through interposed direct-current selective apparatus, of a resistance between the ground and the said direct-current-receiving apparatus.

4. The combination with main conductors having both an alternating and a direct electromotive force impressed thereon, of direct-current-translating apparatus connected to said mains through interposed direct-current selective devices, and a bridging resistance for maintaining a flow of current through said devices.

5. The combination with main conductors having both an alternating and a direct electromotive force impressed thereon and a rotary converter with direct-current commutator and alternating-current collector-rings, of a direct-current selective device interposed between the said main and commutator.

6. The combination with main conductors having both an alternating and a direct electromotive force impressed thereon, of direct-current-translating apparatus connected to said mains through interposed direct-current selective devices, and a connection between the ground and said translating apparatus.

7. The combination of a source of direct and a source of alternating electromotive force, a rotary converter with direct-current commutator and alternating-current collector-rings connected to a common armature-winding, of two line conductors acting respectively as an outgoing and a return conductor, for direct and for alternating currents derived from said sources of electromotive force, means for connecting the commutator of said converter to said line conductors so as to derive direct current therefrom, and means for then connecting the collector-rings of the converter to the line conductors so as to derive alternating current therefrom.

8. The combination with a rotary converter with direct-current commutator and alternating-current collector-rings connected to a common armature-winding, of two line conductors, a source of direct electromotive, means for deriving direct current therefrom and transmitting said current over said line conductor acting as an outgoing and a return conductor respectively to the commutator of said converter, a source of alternating electromotive force, and means for transmitting alternating current derived therefrom over said line conductors, acting as an outgoing and a return conductor respectively, to the collector-rings of the converter.

9. The combination with a rotary converter having a direct-current commutator and alternating-current collector-rings connected to a common armature-winding, of a source of direct and a source of alternating electromotive force, an outgoing and a return line conductor, means for deriving direct current from the source of direct electromotive force and transmitting said current over said outgoing and return conductors to the commutator of said converter, and means for deriving alternating current from the source of alternating electromotive force and transmitting said alternating current over said conductors to the collector-rings of the converter.

10. The combination of a line-circuit consisting of an outgoing and a return conductor, a source of direct and a source of alternating electromotive force, means for applying said electromotive forces to said circuit, a rotary converter with direct-current commutator and alternating-current collector-rings connected to a common armature-winding, means for connecting said commutator to said circuit so as to employ the two conductors thereof as outgoing and return conductors, respectively, and to derive direct current from the source of direct electromotive force, and means for connecting the collector-rings of the converter to said circuit, so as to derive alternating current from said alternating electromotive force.

11. The combination with a source of alternating current, of a transformer connected thereto, a source of direct current connected to a coil of said transformer, a second coil wound upon the core of said transformer and connected to a source of direct current of such polarity that the magnetomotive forces resulting from the direct currents in the two coils are opposite in direction, and automatic means for regulating the direct current in the second coil whereby said two magnetomotive forces are maintained substantially equal and the oversaturation of the core is avoided.

In witness whereof I have hereunto set my hand, before two subscribing witnesses, this 6th day of July, 1899.

FREDERICK BEDELL.

Witnesses:
L. T. SHAW,
G. W. HOPKINS.